(12) United States Patent
Tejeda et al.

(10) Patent No.: US 8,700,274 B1
(45) Date of Patent: Apr. 15, 2014

(54) METHOD OF DETERMINING WHEN A BED OF A HAULING MACHINE IS EMPTY

(71) Applicant: Caterpillar Inc., Peoria, IL (US)

(72) Inventors: Balmes Tejeda, Peoria, IL (US); James W. Landes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/871,401

(22) Filed: Apr. 26, 2013

(51) Int. Cl.
*G06F 19/00* (2011.01)

(52) U.S. Cl.
USPC ............ 701/50; 414/24.5; 414/408; 414/498; 414/495; 414/500; 298/17 R; 298/22 R; 298/24; 242/558; 242/559; 296/190.02; 294/86.41

(58) Field of Classification Search
USPC ........... 701/50; 414/24.5, 408, 498, 495, 500, 414/528, 796.9; 298/17 R, 22 R, 24; 296/190.02; 242/558, 559; 294/86.41
See application file for complete search history.

(56) References Cited

U.S. PATENT DOCUMENTS

| | | | |
|---|---|---|---|
| 4,117,906 A * | 10/1978 | Mustered | 180/420 |
| 4,863,337 A | 9/1989 | Ishiguro et al. | |
| 5,391,843 A | 2/1995 | Sato et al. | |
| 6,079,933 A * | 6/2000 | Moyna et al. | 414/517 |
| 6,183,185 B1 * | 2/2001 | Zanzig et al. | 414/408 |
| 7,233,853 B2 * | 6/2007 | Hendron et al. | 701/50 |
| 7,481,612 B2 * | 1/2009 | Priepke | 414/111 |
| 7,878,751 B2 | 2/2011 | Hagenbuch | |
| 2001/0001637 A1 * | 5/2001 | Zanzig et al. | 414/812 |
| 2006/0095186 A1 * | 5/2006 | Hendron et al. | 701/50 |
| 2009/0045017 A1 | 2/2009 | Joergensen et al. | |
| 2009/0099886 A1 | 4/2009 | Greiner et al. | |
| 2012/0274121 A1 | 11/2012 | Minoshima et al. | |

FOREIGN PATENT DOCUMENTS

| | | |
|---|---|---|
| DE | 102010003921 A1 | 10/2011 |
| EP | 0356067 A2 | 2/1990 |
| EP | 0695930 B1 | 2/1996 |
| JP | 2006-336390 A | 12/2006 |
| WO | WO 2009/008784 A1 | 1/2009 |
| WO | WO 2012/082019 A1 | 6/2012 |
| WO | WO 2012/169358 A1 | 12/2012 |

* cited by examiner

*Primary Examiner* — McDieunel Marc
(74) *Attorney, Agent, or Firm* — Leydig, Voit & Mayer

(57) ABSTRACT

A method implemented by a programmable controller in a hauling machine having an engine, moveable ground engaging elements, and a bed actuable by at least one hoist cylinder controlled by an operator hoist control device, determines whether the bed is empty by determining a position of the operator hoist control device, applying a gain dependent upon the position, applying an integrator over time to provide a resultant hoist figure, comparing the resultant hoist figure to a hoist minimum constant, and, if the hoist figure is less than or equal to the hoist maximum constant, concluding that the bed is empty.

20 Claims, 5 Drawing Sheets

METHOD OF DETERMINING WHEN A BED OF A HAULING MACHINE IS EMPTY

TECHNICAL FIELD

This patent disclosure relates generally to payload hauling machines, and, more particularly to methods of determining when a bed of hauling machine is empty during a dumping procedure.

BACKGROUND

Hauling machines are utilized in various industries to transport a payload from one location to another. In order to operate such machines efficiently, it is desirable to carry an optimally sized payload. Loading a machine to less than full capacity may result excess costs associated with unnecessary runs and the acceleration of maintenance schedules. Overloading a machine may result in increased wear and costly maintenance.

Numerous methods have been proposed for determining the mass of payloads in hauling machines. While physically weighing a machine on a scale and then deducting the weight of the machine itself may be a reliable method of measuring a payload, such an arrangement is not practical in large machines. Moreover, physically weighing a machine is generally not possible in the field.

Various methods have been proposed for the operation of hauling machines and monitoring payloads during use. For example, U.S. Publication 2012/0274121 to Minoshima, et al., discloses a load transporting vehicle with a pivoted vessel that may be raised obliquely backward with respect to the vehicle body by a hoist cylinder. A pressure sensor is provided on the rear suspension to detect an inner pressure of the rear suspension. The pressure will vary depending upon whether the vessel if loaded or empty as it returns from a pivoted to an unpivoted position. The sensor detects whether the burden is changed based upon the pressure. A controller calculates the weight from the pressure and compares it to a known weight value for an empty vessel to determine whether the vessel is empty or loaded. The arrangement of the Minoshima reference, however, does not appear to be applicable to hauling machines including an ejector bed.

SUMMARY

The disclosure describes, in one aspect, a method implemented by a programmable controller in a hauling machine having an engine, moveable ground engaging elements, and a bed actuable by at least one hoist cylinder controlled by an operator hoist control device. The method of determining whether the bed is empty includes determining a position of the operator hoist control device, applying a gain dependent upon the position, applying an integrator over time to provide a resultant hoist figure, comparing the resultant hoist figure to a hoist minimum constant, and, if the hoist figure is less than or equal to the hoist maximum constant, concluding that the bed is empty.

BRIEF DESCRIPTION OF THE DRAWING(S)

While the appended claims set forth the features of the present invention with particularity, the invention and its advantages are best understood from the following detailed description taken in conjunction with the accompanying drawings, of which:

DETAILED DESCRIPTION

Figure 1:
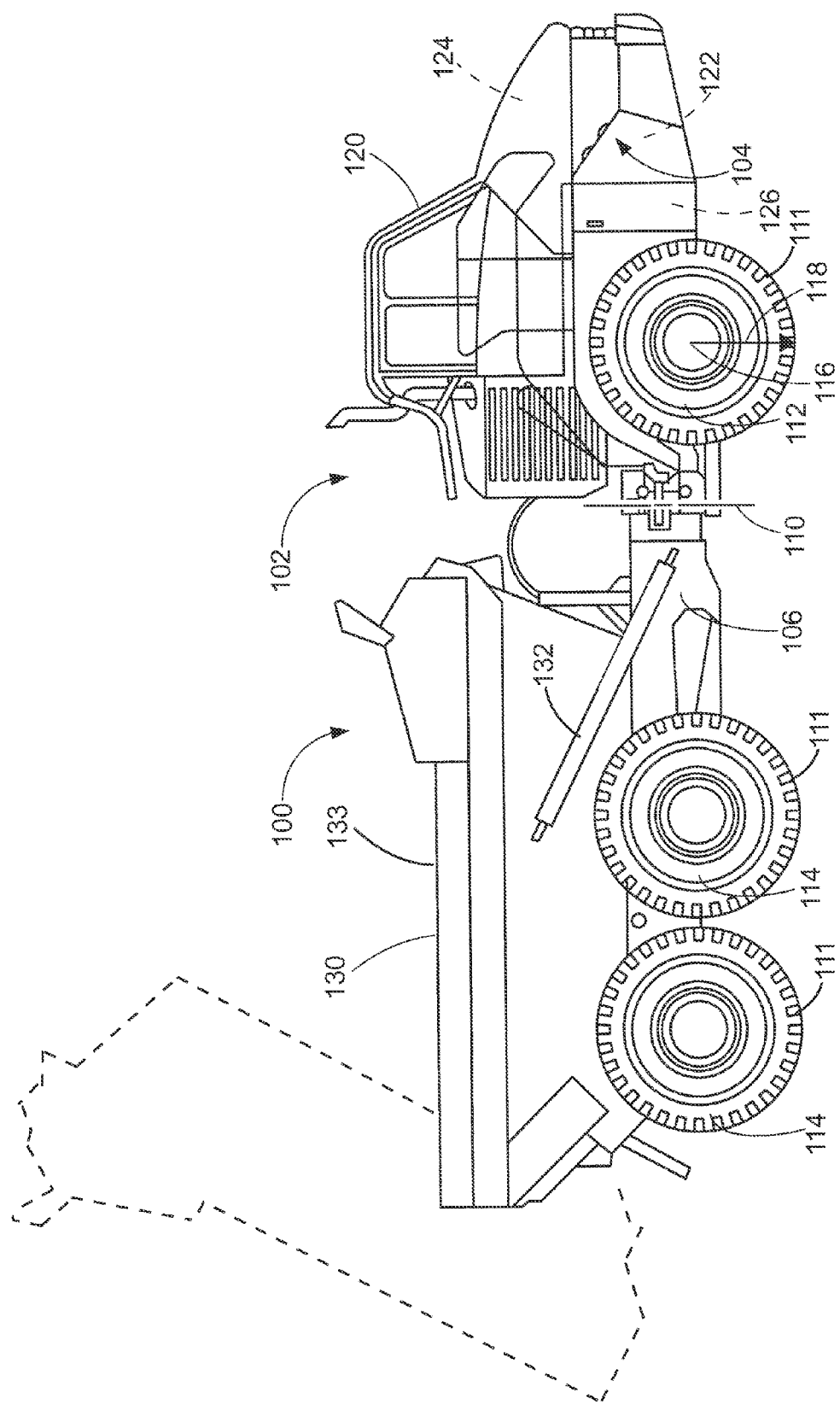
FIG. 1 is a diagrammatical side elevational view of an articulated truck machine/vehicle, which is illustrated as one example of a machine suitable for incorporating a method of determining when a bed of the machine is empty in accordance with the disclosure.

This disclosure relates to hauling machines and the determination of the mass of a carried payload. FIG. 1 that provides a schematic side elevational view of one example of a machine 100 incorporating a machine payload control strategy according to the disclosure. In the illustration of FIG. 1, the machine 100 is a truck, which is one example for a machine to illustrate the concepts of the described machine payload control strategy. While the arrangement is illustrated in connection with a truck, the arrangement described herein has potential applicability in various other types of payload hauling machines, such as wheel loaders, motor graders, etc. The term "machine" refers to any machine that performs some type of operation associated with an industry such as mining, construction, farming, transportation, or any other industry known in the art. For example, the machine may be a dump truck, backhoe, grader, material handler or the like. The term vehicle is intended to incorporate substantially the same scope as the term machine, in that a vehicle is a machine that travels.

Referring to FIG. 1, the illustrated machine 100 is an articulated truck 102 that includes front and rear frame portions 104, 106 coupled at an articulation axis 110, and supported on ground engaging elements 111, such as front wheels 112 and/or rear wheels 114. The front frame portion 104 supports a cab 120, and, typically, a drive system 122. The drive system 122 typically includes an internal combustion engine configured to transmit power to a transmission 126. The transmission in turn may be configured to transmit power to the ground engaging elements 111 (e.g., front wheels 112) by way of axle 116 using any known means. The wheel 112 has a radius 118, which corresponds to the rolling radius 118 of the driven wheel on a driven surface (e.g., the distance from the center of the driven wheel 112 to the ground).

The rear frame portion 106 supports a bed 130. In the illustrated machine 100, the bed 130 may be selectively pivoted between a load position (illustrated) and an unload position (shown in phantom) by one or more hoist cylinders 132 in response to commands from operator hoist control 134 (see FIG. 2) typically located in the cab 120. While an articulated truck 102 with a pivoted bed 130 is illustrated, aspects of this disclosure may apply to other load hauling machines including, for example, unarticulated machines, or machines including a bed that incorporates an ejector plate that may be actuated by one or more dump cylinders to similarly push or eject a payload 133 contained in the bed 130.

Figure 2:
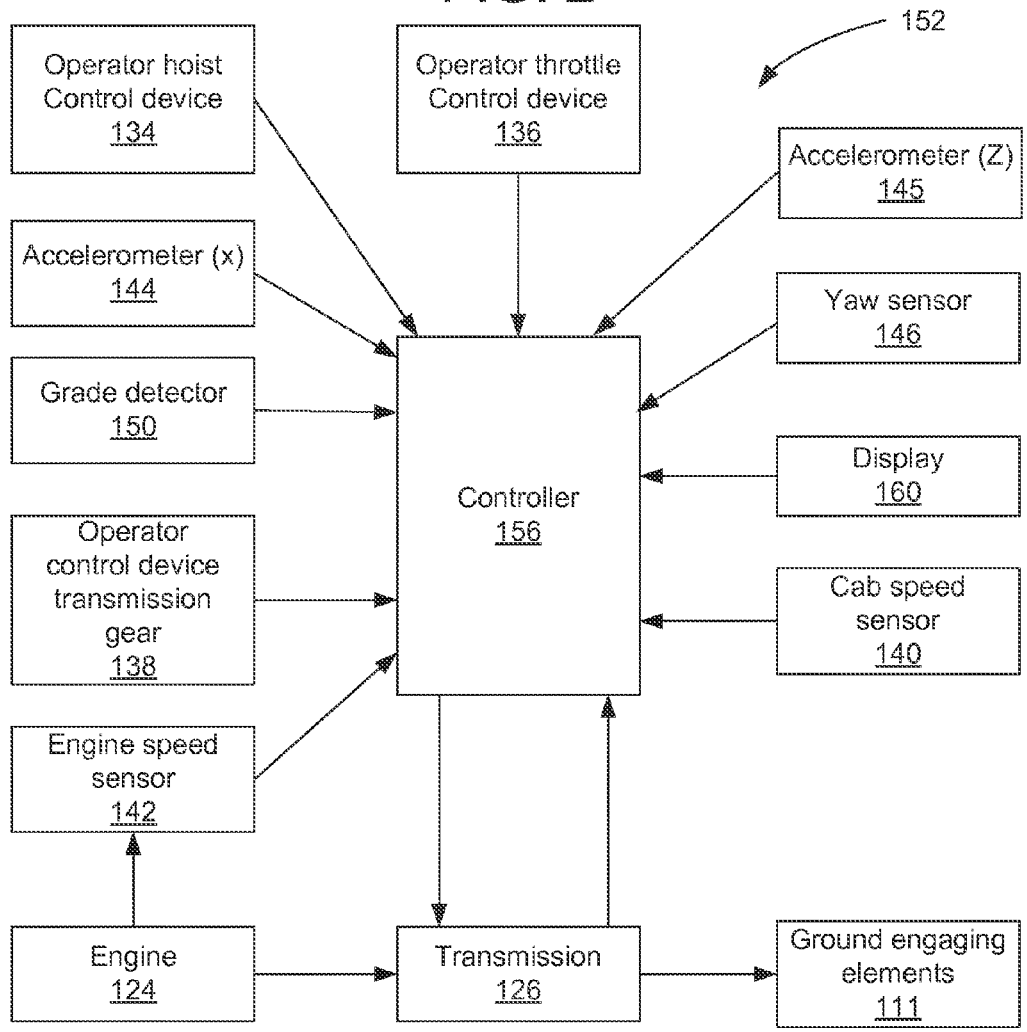
FIG. 2 is a box diagram representation of a programmable controller and inputs to the controller for an exemplary machine in accordance with aspects of methods of the disclosure.

The machine 100 may include additional operator controls, such as a throttle 136, and a transmission gear control 138 by which an operator may choose a particular gear from a given selection of gears (see FIG. 2). The machine 100 may additionally include a plurality of gauges and/or sensors associated with operation of the machine 100, such as a cab speed sensor 140, engine speed sensor 142, accelerometer(s) 144, 145 associated with the fore and aft direction (X) and the vertical direction (Z), and/or yaw sensor 146. The machine 100 may further include sensors adapted to sense environmental characteristics. For example, the machine 100 may include a tilt sensor, inclinometer, or grade detector 150. While each of these controls and sensors is illustrated diagrammatically in the simplified box diagram of a control system 152 in FIG. 2, the machine 100 may include additional, different, or less controls and sensors.

The controls and sensors provide signals indicative of the respective control or sensed feature to a programmable controller 156. During operation of the machine 100, the controller 156 may be configured to receive and process information relating to operation of the machine 100 and to provide a determination of the mass of a payload 133 carried by the machine 100 during dynamic operation by methods described with regard to FIGS. 3-6. The determined mass may be communicatively coupled, for example, to a display 160 within the cab 120 or to a remote operation or monitoring location (not shown). For the purpose of this disclosure, the terms "dynamic operation" or "dynamic conditions" will refer to operations and conditions wherein the machine 100 is moving as a result of operation of the drive system 122 to power ground engaging elements 111, such as the front wheels 112 and/or rear wheels 114.

The controller 156 may include a processor (not shown) and a memory component (not shown). The processor may be microprocessors or other processors as known in the art. In some embodiments the processor may be made up of multiple processors. Instructions associated with the methods described may be read into, incorporated into a computer readable medium, such as the memory component, or provided to an external processor. In alternative embodiments, hard-wired circuitry may be used in place of or in combination with software instructions. Thus, embodiments are not limited to any specific combination of hardware circuitry and software.

The term "computer-readable medium" as used herein refers to any medium or combination of media that is non-transitory, and participates in providing computer executable instructions to a processor for execution facilitating performing a method, implemented by a programmable controller. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above. The memory component may include multiple memory components.

The controller 156 may be a part of a control module may be enclosed in a single housing. In alternative embodiments, the control module may include a plurality of components operably connected and enclosed in a plurality of housings. In still other embodiments the control module may be located in single location or a plurality of operably connected locations including, for example, being fixedly attached to the machine 100 or remotely to the machine 100.

Figure 3:
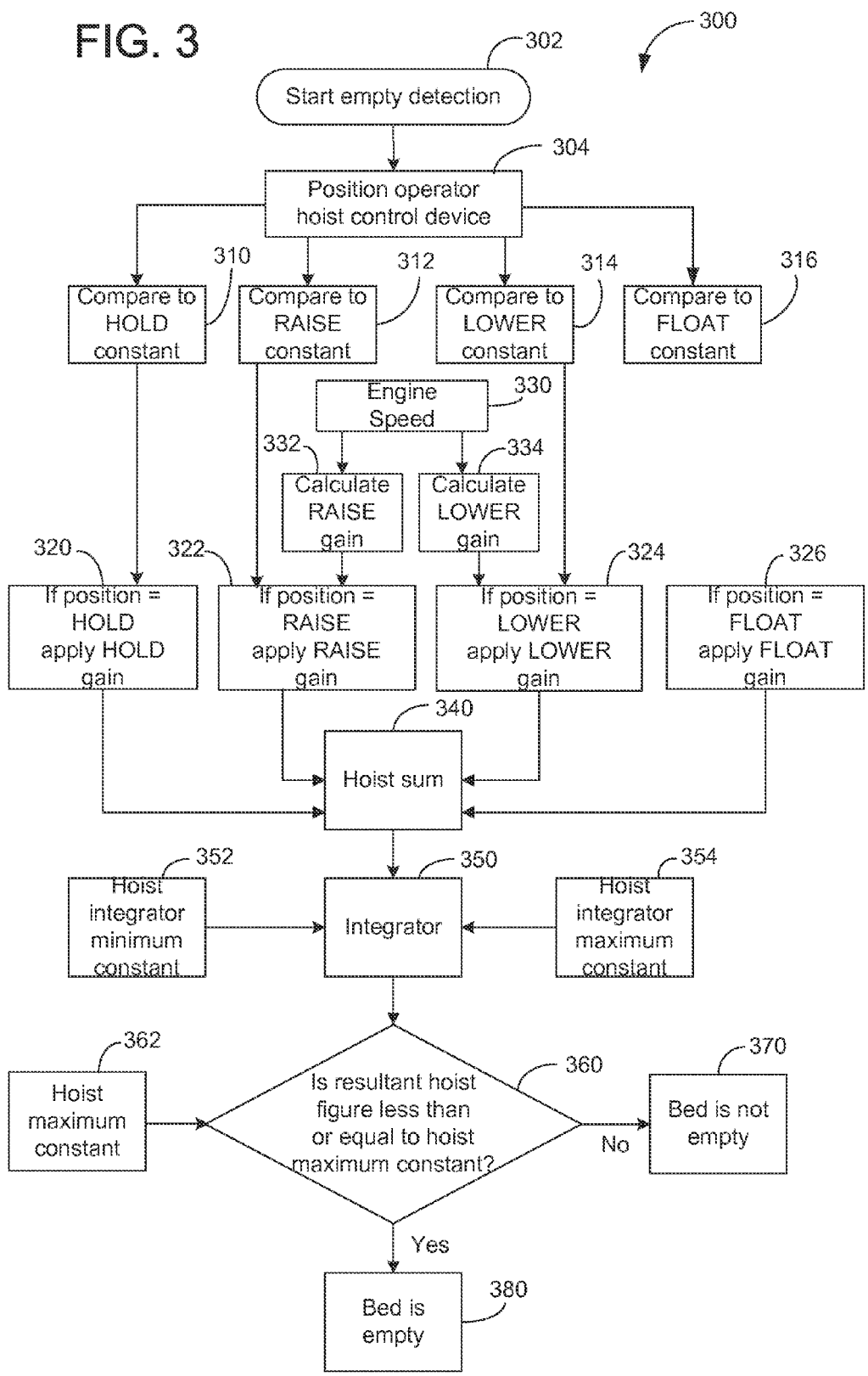
FIG. 3 is a flowchart summarizing operation of an exemplary method carried out by a programmable controller to estimate when the bed of the machine is empty, in accordance with the disclosure.

Turning now to FIG. 3, there is illustrated an exemplary control strategy 300 for determining the bed 130 of a machine 100 is empty, that is, when the payload 133 has been unloaded from the bed 130. The strategy 300 is initiated at reference number 302, and utilizes a value over time for an operator command to the operator hoist control 134 to extend, retract or float the hydraulic cylinder(s) 132 associated with unloading the payload 133 from the bed 130. That is, when the operator hoist control 134 is disposed in a RAISE position for at least a given period, then it is assumed that the hydraulic cylinders 132 are fully extended such that the bed 130 is in a fully up position, or, in the case of a machine 100 including an ejector bed, that the ejector plate is in the final dump position. Similarly, if the operator hoist control 134 is in the FLOAT or LOWER positions for at least a given period, then it is assumed that the hydraulic cylinders 132 are fully retracted such that the bed 130 is in a fully down position, or, in the case of the a machine 100 including an ejector bed, that the ejector plate is in the fully retracted position.

More specifically, and as explained above with regard to FIG. 2, the operator hoist control 134 may provide a signal indicative of the position of the operator hoist control device 134 (see FIG. 2) to the controller 156 (see box 304). The controller 156 compares the signal indicative of the position of the operator hoist control device 134 to respective predetermined HOLD, RAISE, LOWER, and FLOAT constants (see boxes 310, 312, 314, and 316). In an embodiment, the signal indicative of the position of the operator hoist control device 134 may be, for example, represented by numbers ranging from zero (0) to three (3), and the HOLD, RAISE, LOWER, and FLOAT constants may likewise range from zero (0) to three (3).

If the position of the operator control hoist 134 is equal to the predetermined HOLD, RAISE, LOWER, and FLOAT constant, a respective gain is applied (see boxes 320, 322, 324, 326). In an embodiment, the gain may be in the form of one or more multiplier(s). In such an embodiment, for example, if the position of the operator control hoist 134 is not equal to the respective, predetermined HOLD, RAISE, LOWER, and FLOAT constant, the position continues as a null, or zero (0), such that the product of an applied gain, or multiplier, likewise would be a null or zero (0). Conversely, in such an embodiment, if the position of the operator control hoist 134 is equal to the predetermined HOLD, RAISE, LOWER, and FLOAT constant, the position may continue as one (1). As a result, the product of the application of the gain, or multiplier, would be equal to the gain itself.

The respective gain may be predetermined to provide a result consistent with a conclusion of whether the bed 130 is empty following the remaining operations of the strategy 300, as discussed below. By way of example only, volumes of associated components, flows, and time constants may be utilized in the determination of a respective gain. Moreover, gains may be dependent upon factors related to the type and size of machine 100. By way of further example, the FLOAT gain would assume that the disposal of the operator hoist control 134 in the FLOAT position for at least a given period is associated with a disposition of the hydraulic cylinders 132 in a fully retracted position such that the bed 130 is empty. In an embodiment, for each of the positions HOLD and FLOAT, the gain may be a respective, predetermined constant.

The respective gain may include multiple components, however, and/or may be dynamically calculated (see boxes 330-334). In an embodiment, for each of the positions of RAISE and LOWER, the respective gain is dynamically calculated. In this regard, operation of components, such as a pump (not shown) associated with the hydraulic cylinder(s) 132, may affect the RAISE gain or the LOWER gain. As a result, the strategy 300 additionally considers the engine speed (box 330; see, for example, the engine speed sensor 142 in FIG. 2), as it changes the speed of a pump associated with the hydraulic cylinder(s) 132 in connection with the determination of the RAISE gain and the LOWER gain. In this way, in the event that the operator revs the engine 124 during RAISE or LOWER hoist commands, the illustrated strategy 300 takes into account changes in the gain that may result. In an embodiment, each of the RAISE gain and the LOWER gain is dynamically calculated (see boxes 332, 334) and includes at least two components. In each case, the engine speed (box 330) is multiplied by a first component of the gain, the product of which is added to a second component of the gain.

The resulting HOLD, RAISE, FLOAT, and LOWER gains (310, 312, 314, 316) are added together to provide a hoist sum (see box 340). Inasmuch as the operator control hoist 134 will be in a single position, i.e., HOLD, RAISE, FLOAT, or LOWER, the hoist sum 340 will equal the gain only from the position of the operator control hoist 134.

The hoist sum 340 is integrated over time (see box 350) to provide a hoist figure (see box 360). In order to limit the integrator in the event that the operator hoist control device 134 remains in a position indicating a RAISE or LOWER command indefinitely, hoist integrator minimum and maximum constants are supplied (see boxes 352, 354). If the resultant hoist figure is less than the hoist integrator minimum constant 352, the integration is stopped. Similarly, if the resultant hoist figure is greater than the hoist integrator maximum constant 354, the integration is stopped.

Turning now to decision box 360, the resultant hoist figure is compared to a hoist maximum constant 362. If the resultant hoist figure is not less than or equal to the hoist maximum constant 362, the bed 130 is not empty (see box 370). Conversely, if the resultant hoist figure is less than or equal to the hoist maximum constant 362, the bed 130 is empty (see box 370).

While the various steps of the control strategy 300 are illustrated and discussed in a particular order, those of skill will appreciate that the steps may be performed in an alternate order to arrive at the final determination of whether the bed 130 is empty (see boxes 370, 380), unless otherwise specifically noted or apparent. For example, while FIG. 3 illustrated the comparisons of boxes 310, 312, 314, 316 as occurring simultaneously, they may alternately occur sequentially.

Figure 4:
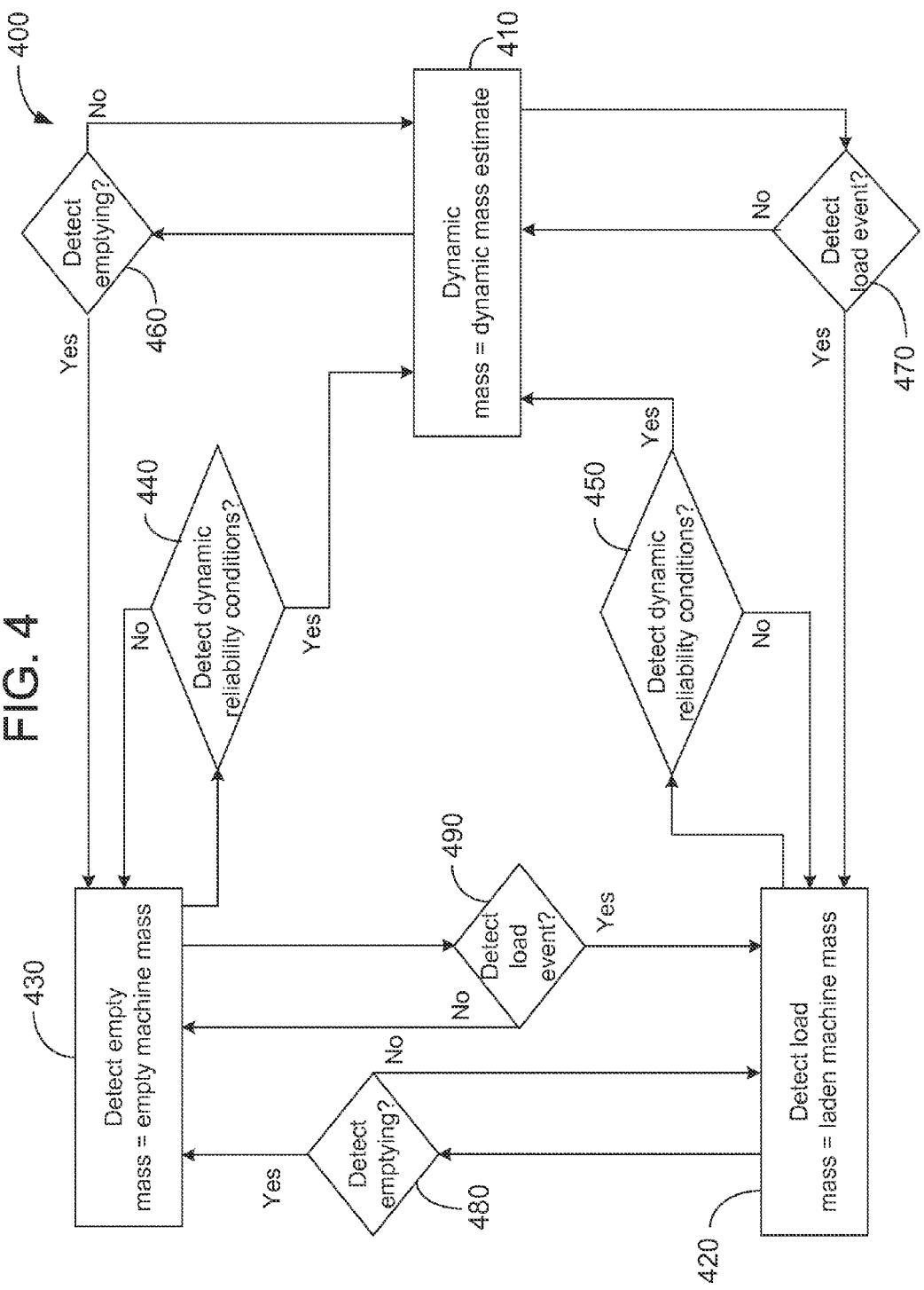
FIG. 4 is a flowchart summarizing operation of an exemplary strategy for determining the mass of a payload of a hauling machine incorporating the methods of FIG. 3.

The strategy 300 for estimating when the bed 130 of a machine 100 is empty may be a part of a larger strategy or integration algorithm for estimating the mass of a payload 133 of a machine 100. Turning to FIG. 4, there is shown an exemplary integration strategy 400 for the estimation of the mass of a payload 133 during various conditions. The integration strategy 400 may include a strategy (box 410) for determining a dynamic mass estimate, along with a strategy (box 420) related to a loading event, and a strategy (box 430) related to an emptying event. In this way, while the machine 100 is operating, functions the programmable controller 156 monitors various functions and parameters of the machine 100 and the environment to determine what, if any mass determination is appropriate. The calculated, estimated mass may be utilized in algorithms for continued determinations related to the machine 100.

From the determination of a dynamic mass estimate (box 410), if emptying of the bed 130 is detected (decision box 460), the strategy 430 directed to an emptying event may be applied to determine whether the bed 130 is empty, there is no payload 133 contained in the bed 130. Conversely, if a load event is detected (decision box 470), the strategy 420 directed to a loading event may be applied to determine if a loading event is occurring.

Similarly, from the determination of a loading event by the strategy 420, if the conditions are detected for the reliable determination of a dynamic mass estimate (decision box 450), then the strategy 410 for the determination of the mass under dynamic conditions may be applied. Conversely, if an emptying event is detected (decision box 480), the strategy 430 directed to an emptying even may be applied to determine whether the bed 130 is empty.

Finally, from the determination of an emptying event by the strategy 430, if the conditions are detected for the reliable determination of a dynamic mass estimate (decision box 440), then the strategy 410 for the determination of the mass under dynamic conditions may be applied. Again, conversely, if a load event is detected (decision box 490), the strategy 420 directed to a loading event may be applied to determine if a loading event is occurring.

Figure 5:
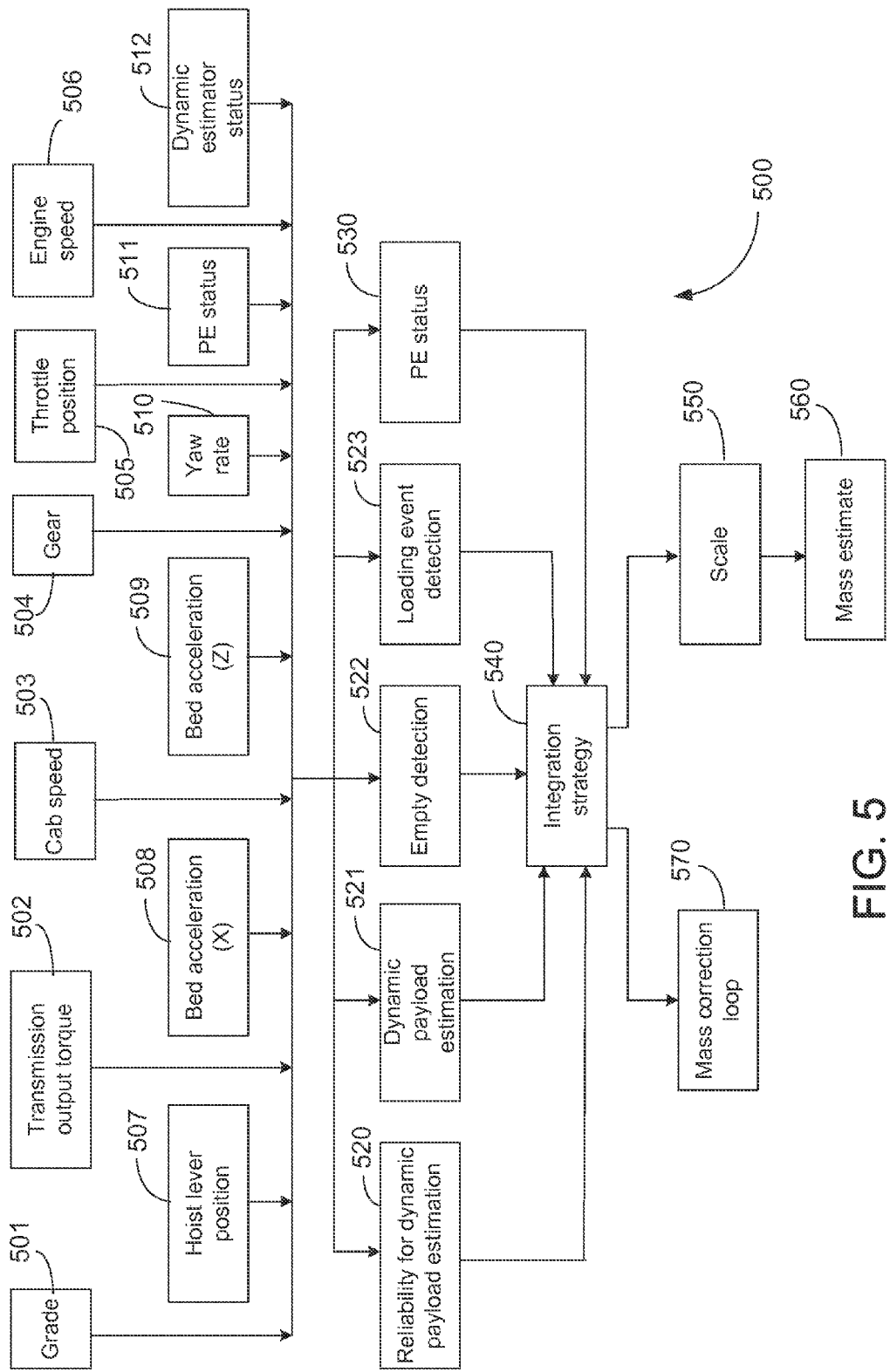
FIG. 5 is a flowchart summarizing operation of an exemplary strategy for determining the mass of a payload of a hauling machine incorporating the methods of FIGS. 3-4.

The integration strategy 400 of FIG. 4 is shown the context of the larger context of a top level algorithm 500 in FIG. 5. Information may be provided from various sources, such as, for example, those illustrated in FIG. 2. By way of example only, information may be provided regarding the grade (box 501) from the grade detector 150, transmission output torque (box 502) based upon calculations or information from the transmission 126, cab speed (box 503) from the cab speed sensor 140, gear (box 504) based upon the operator transmission gear control 138, throttle position (box 505) based upon a sensor or the operator control device for the throttle 136, engine speed (box 506) based upon the engine speed sensor 142, hoist lever position (box 507) based upon a sensor or the operator hoist control 134, bed acceleration in the X and Z directions (boxes 508 and 509) based upon accelerometers 144, 145, and the yaw rate (box 510) based upon a yaw sensor 146. Further, in an embodiment, any appropriate mechanism may be utilized to provide an indication of whether sensors and other devices providing information are in working condition (see, for example, PC status 511 and dynamic estimator status 512).

From the information provided, individual strategies 520-523 may be applied for determining the reliability of a dynamic payload mass estimation, estimating a dynamic payload mass, emptying detection, and loading event detection. Again, an embodiment may further include any appropriate mechanism for providing an indication that all individual strategies are proceeding (box 530). From the operation of the individual strategies 520-523 along with the integration strategy (box 540) such as the integration strategy 400 illustrated in FIG. 4, an estimated mass is determined. The estimated mass is then scaled (box 540) for delivery to a data link module (not illustrated) to provide a broadcast mass estimate (box 550). Further, the estimated mass obtained may be utilized in the additional algorithms, as indicated by box 570, the mass correction loop.

INDUSTRIAL APPLICABILITY

The present disclosure is applicable to machines 100 including a bed 130 for carrying a payload 133. Embodiments of the disclosed strategy may have the ability to estimate payload mass without the use of any other weight sensors.

Some embodiments may be utilized with machines having ejector beds. Some embodiments may not require position sensors for determining the position of the bed 130, associated ejector mechanisms, or the hydraulic cylinders 132.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. In a hauling machine having an engine, moveable ground engaging elements, and a bed actuable by at least one hoist cylinder controlled by an operator hoist control device, a method, implemented by a programmable controller, of determining whether the bed is empty, the method comprising:
    determining a position of the operator hoist control device,
    applying a gain dependent upon the position,
    applying an integrator over time to provide a resultant hoist figure,
    comparing the resultant hoist figure to a hoist minimum constant,
    if the hoist figure is less than or equal to the hoist maximum constant, concluding that the bed is empty.

2. The method of claim 1 wherein the step of determining the position of the operator hoist control device includes comparing a signal indicative of the position of the operator hoist control device to at least one predetermined constant.

3. The method of claim 1 wherein the step of determining the position of the operator hoist control device includes
    comparing a signal indicative of the position of the operator hoist control device to a predetermined hold constant to determine if the operator hoist control device is in a hold position,
    comparing a signal indicative of the position of the operator hoist control device to a predetermined raise constant to determine if the operator hoist control device is in a raise position,
    comparing a signal indicative of the position of the operator hoist control device to a predetermined lower constant to determine if the operator hoist control device is in a lower position, and
    comparing a signal indicative of the position of the operator hoist control device to a predetermined float constant to determine if the operator hoist control device is in a float position.

4. The method of claim 3 wherein
    wherein the step of applying a gain dependent upon the position includes
        applying a predetermined hold gain if the operator hoist control device is in a hold position,
        applying a predetermined float gain if the operator hoist control device is in a float position,
        determining the speed of the engine,
        calculating a raise gain dependent at least in part upon the speed,
        applying the calculated raise gain if the operator hoist control device is in a raise position,
        calculating a lower gain dependent at least in part upon the speed, and
        applying the calculated lower gain if the operator hoist control device is in a lower position
    wherein the step of applying an integrator over time includes applying at least one of a predetermined hoist integrator minimum constant or a predetermined hoist integrator maximum constant to limit application of the integrator, and
    further including providing a signal to a display to indicate whether the bed is empty.

5. The method of claim 1 wherein the predetermined gain is dependent upon factors specific to the machine.

6. The method of claim 1 wherein the step of applying a gain dependent upon the position includes applying a predetermined gain.

7. The method of claim 1 wherein the step of applying a gain dependent upon the position includes applying a predetermined hold gain if the operator hoist control device is in a hold position, and applying a predetermined float gain if the operator hoist control device is in a float position.

8. The method of claim 1 wherein the step of applying a gain dependent upon the position includes applying a dynamically calculated gain.

9. The method of claim 1 further including determining a speed of the engine, and calculating a gain based at least in part upon the speed.

10. The method of claim 1 wherein the step of applying a gain dependent upon the position includes applying a dynamically calculated raise gain if the operator hoist control device is in a raise position, and applying a dynamically calculated lower gain if the operator hoist control device is in a lower position.

11. The method of claim 10 further including determining a speed of the engine, and calculating at least one of the raise gain or the lower gain based at least in part upon the speed.

12. The method of claim 1 wherein the step of applying a gain dependent upon the position includes
- applying a predetermined hold gain if the operator hoist control device is in a hold position,
- applying a predetermined float gain if the operator hoist control device is in a float position,
- determining the speed of the engine,
- calculating a raise gain dependent at least in part upon the speed,
- applying the calculated raise gain if the operator hoist control device is in a raise position,
- calculating a lower gain dependent at least in part upon the speed, and
- applying the calculated lower gain if the operator hoist control device is in a lower position.

13. The method of claim 1 further including applying at least one of a predetermined hoist integrator minimum constant or a predetermined hoist integrator maximum constant to limit application of the integrator.

14. The method of claim 1 further including providing a signal to a display to indicate whether the bed is empty.

15. A non-transitory computer-readable medium including computer-executable instructions facilitating performing a method, implemented by a programmable controller, of determining whether a bed is empty in a hauling machine therein the bed is actuable by at least one hoist cylinder controlled by an operator hoist control device, a method comprising:
- determining a position of the operator hoist control device,
- applying a gain dependent upon the position,
- applying an integrator over time to provide a resultant hoist figure,
- comparing the resultant hoist figure to a hoist minimum constant,
- if the hoist figure is less than or equal to the hoist maximum constant, concluding that the bed is empty.

16. The non-transitory computer-readable medium of claim 15 wherein the step of determining the position of the operator hoist control device includes
- comparing a signal indicative of the position of the operator hoist control device to a predetermined hold constant to determine if the operator hoist control device is in a hold position,
- comparing a signal indicative of the position of the operator hoist control device to a predetermined raise constant to determine if the operator hoist control device is in a raise position,
- comparing a signal indicative of the position of the operator hoist control device to a predetermined lower constant to determine if the operator hoist control device is in a lower position, and
- comparing a signal indicative of the position of the operator hoist control device to a predetermined float constant to determine if the operator hoist control device is in a float position.

17. The non-transitory computer-readable medium of claim 15 wherein the step of applying a gain dependent upon the position includes
- applying a predetermined hold gain if the operator hoist control device is in a hold position,
- applying a predetermined float gain if the operator hoist control device is in a float position,
- determining the speed of the engine,
- calculating a raise gain dependent at least in part upon the speed,
- applying the calculated raise gain if the operator hoist control device is in a raise position,
- calculating a lower gain dependent at least in part upon the speed, and
- applying the calculated lower gain if the operator hoist control device is in a lower position.

18. The non-transitory computer-readable medium of claim 15 wherein the step of applying an integrator over time includes applying at least one of a predetermined hoist integrator minimum constant or a predetermined hoist integrator maximum constant to limit application of the integrator.

19. A hauling machine comprising
- a bed adapted to carry a payload,
- at least one hoist disposed and adapted to empty a payload from the bed,
- at least one operator hoist control device adapted to cause operation of the hoist, and
- a programmable controller configured by computer-executable instructions to determine whether the bed is empty, the programmable controller using a set of parameters including:
  - a position of the operator hoist control device,
  - time that the operator hoist control device is disposed in the position,
  - engine speed,
  - at least one predetermined constant indicative of a respective position of the operator hoist control device,
  - a hoist maximum constant, and
  - an integrator applied over time.

20. The hauling machine of claim 19 wherein the machine further includes an engine, and the set of parameters further includes engine speed, and at least one of a predetermined gain or a gain dynamically calculated based at least in part upon engine speed.

* * * * *